United States Patent [19]

Bluhm

[11] Patent Number: 5,937,178
[45] Date of Patent: *Aug. 10, 1999

[54] REGISTER FILE FOR REGISTERS WITH MULTIPLE ADDRESSABLE SIZES USING READ-MODIFY-WRITE FOR REGISTER FILE UPDATE

[75] Inventor: Mark W. Bluhm, Plano, Tex.

[73] Assignee: National Semiconductor Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/906,859

[22] Filed: Aug. 6, 1997

Related U.S. Application Data

[63] Continuation of application No. 08/600,569, Feb. 13, 1996, abandoned.

[51] Int. Cl.[6] ................................................. G06F 12/04
[52] U.S. Cl. ............................ 395/394; 395/393; 711/212
[58] Field of Search .................................... 395/392, 393, 395/394, 395; 711/154, 155, 168, 150, 212

[56] References Cited

U.S. PATENT DOCUMENTS

| | | | |
|---|---|---|---|
| 4,663,728 | 5/1987 | Weatherford et al. | 711/155 |
| 4,980,817 | 12/1990 | Fossum et al. | 395/800.04 |
| 4,992,938 | 2/1991 | Cocke et al. | 395/393 |
| 5,499,380 | 3/1996 | Iwata et al. | 711/212 |
| 5,537,560 | 7/1996 | Boggs et al. | 395/595 |
| 5,568,624 | 10/1996 | Sites et al. | 395/564 |
| 5,627,985 | 5/1997 | Fetterman et al. | 395/393 |

*Primary Examiner*—Viet D. Vu
*Attorney, Agent, or Firm*—Andrew S. Viger

[57] ABSTRACT

A microprocessor includes an execution unit for processing a stream of instructions wherein one or more of the instructions reference the eight logical x86 general purpose registers as source and destination registers for operands for the instructions. The microprocessor further includes a register file with a plurality of physical registers in excess of the eight x86 general purpose registers. The physical registers in the register file are mapped to the logical x86 general purpose registers such that one of the physical registers may contain one or more logical source or destination registers of the x86 general purpose registers for an instruction. The register file drives the entire bits of the physical register which contains the destination register for the instruction onto an internal bus. The bits are stored in a latching circuit in the register file. The execution unit performs the instruction and returns the resulting operand to be stored in the logical destination register. A multiplexing circuit then overwrites the bits in the physical register corresponding to the logical destination register with the resulting operand. The bits of the physical register are then written back to the physical registers.

6 Claims, 6 Drawing Sheets

REGISTER FILE FOR REGISTERS WITH MULTIPLE ADDRESSABLE SIZES USING READ-MODIFY-WRITE FOR REGISTER FILE UPDATE

The present application is a file wrapper continuation of application Ser. No. 08/600,569, filed Feb. 13, 1996, now abandoned.

TECHNICAL FIELD OF THE INVENTION

This invention is in the field of integrated circuits, and is more particularly directed to a circuit and method for operating the same for writing data to a register file on a byte by byte basis without requiring byte writable registers.

BACKGROUND OF THE INVENTION

The x86 family of processors contains 8 general registers named EAX, EBX, ECX, EDX, ESP, EBP, ESI and EDI. The structure of these eight general registers is shown in FIG. 1.

As seen in FIG. 1, an "E" register designation signifies the entire 32 bits of a register while an "X" register designation signifies the lower 16 bits of a register. With respect to the lower 16 bits of the EAX, EBX, ECX and EDX, the "H" register designation signifies the higher order eight bits from 15 to 8, and the "L" register designation signifies the lower order eight bits from 7 to 0.

The lower 16 bits (bits 0–15) of the general purpose registers may be accessed separately from the upper 16 bits (bits 16–31). In addition, the first four registers in FIG. 1, EAX, EBX, ECX and EDX, are byte writable, i.e. both the first 8 bits (bits 0–7) and the second 8 bits (8–15) of the registers are accessible separately and act as independent registers. For example, if the AH register is written to by an instruction, the AL register remains unchanged.

In the prior art, a separate control line is necessary to write to each byte or word of the eight general purpose registers. For instance, the EAX register requires three control lines: a first to the AL register, a second to the AH register and a third to the EAX register.

In super-pipelined, super-scalar processors such as the one described in U.S. patent application Ser. No. 08/138,281, filed Oct. 18, 1993, entitled, "Pipelined Processor with Register Hardware to Accommodate Multiple Size Registers," which is incorporated by reference herein, the eight general purpose registers are mapped to 32 physical registers contained in a register file. A register translation unit controls the allocation of the 32 physical registers to the eight logical general purpose registers. This allocation is based on various state information described in the above referenced patent application. However, there is no restriction on which logical registers may be addressed to a particular physical register. Any of the 32 physical registers may be mapped to the first four logical register EAX, EBX, ECX, and EDX. Thus, each of the 32 physical registers must be byte writable and, according to prior art techniques, this requires at least three control lines to each of the 32 physical registers. A total of 256 control lines would be necessary for the register file.

A need has thus arisen for a superior way to write to the general purpose register file.

It is thus an object of the present invention to provide an apparatus and method of operating the apparatus for writing to a register file with a reduced number of control lines to each register.

It is a further object of the present invention to provide an apparatus and method of operating the apparatus in which the data in each register may be modified on a byte by byte basis.

It is still a further object of the present invention to provide an apparatus and method of operating the apparatus in which data in subsequent instructions may be quickly forwarded to the processor instruction without first writing the data to the register file.

Other objects and advantages of the present invention will be apparent to those of ordinary skill in the art having reference to the following specification.

SUMMARY OF THE INVENTION

The microprocessor of the present invention comprises an execution unit for processing a stream of instructions, wherein one or more of the instructions reference a defined set of logical registers as source and destination registers for operands for the instructions. The microprocessor also includes a register file with a plurality of physical registers, in excess of said defined set of logical registers, wherein said set of logical registers are mapped to the plurality of physical registers such that each of said physical registers includes one or more of the source and destination registers for operands. A latching circuit in the register file latches onto data from one of the plurality of physical registers that includes the destination register for the operand of the current instruction. A read/write circuit receives this destination data from the latching circuit and also receives the resulting operand of the current instruction from the execution unit of the microprocessor. The read/write circuit selects data, on a byte by byte basis, from the resulting operand and from the destination data from the latching circuit to be written back to the physical registers.

BRIEF DESCRIPTION OF THE DRAWINGS

For a more complete understanding of the present invention and the advantages thereof, reference is now made to the following descriptions taken in conjunction with the accompanying drawings.

DETAILED DESCRIPTION OF THE PREFERRED EMBODIMENT

Figures 1, 2B:
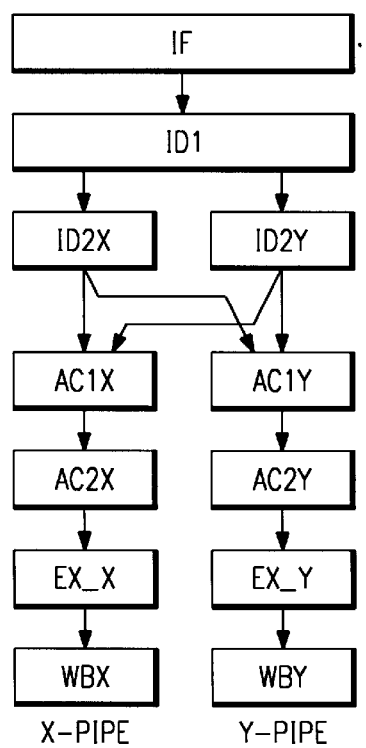
FIG. 1 illustrates, in block diagram form, the structure of the general purpose registers of the x86 architecture.
FIGS. 2a and 2b illustrate, in block diagram form, a microprocessor in which the present invention may be incorporated.
Figure 2A:
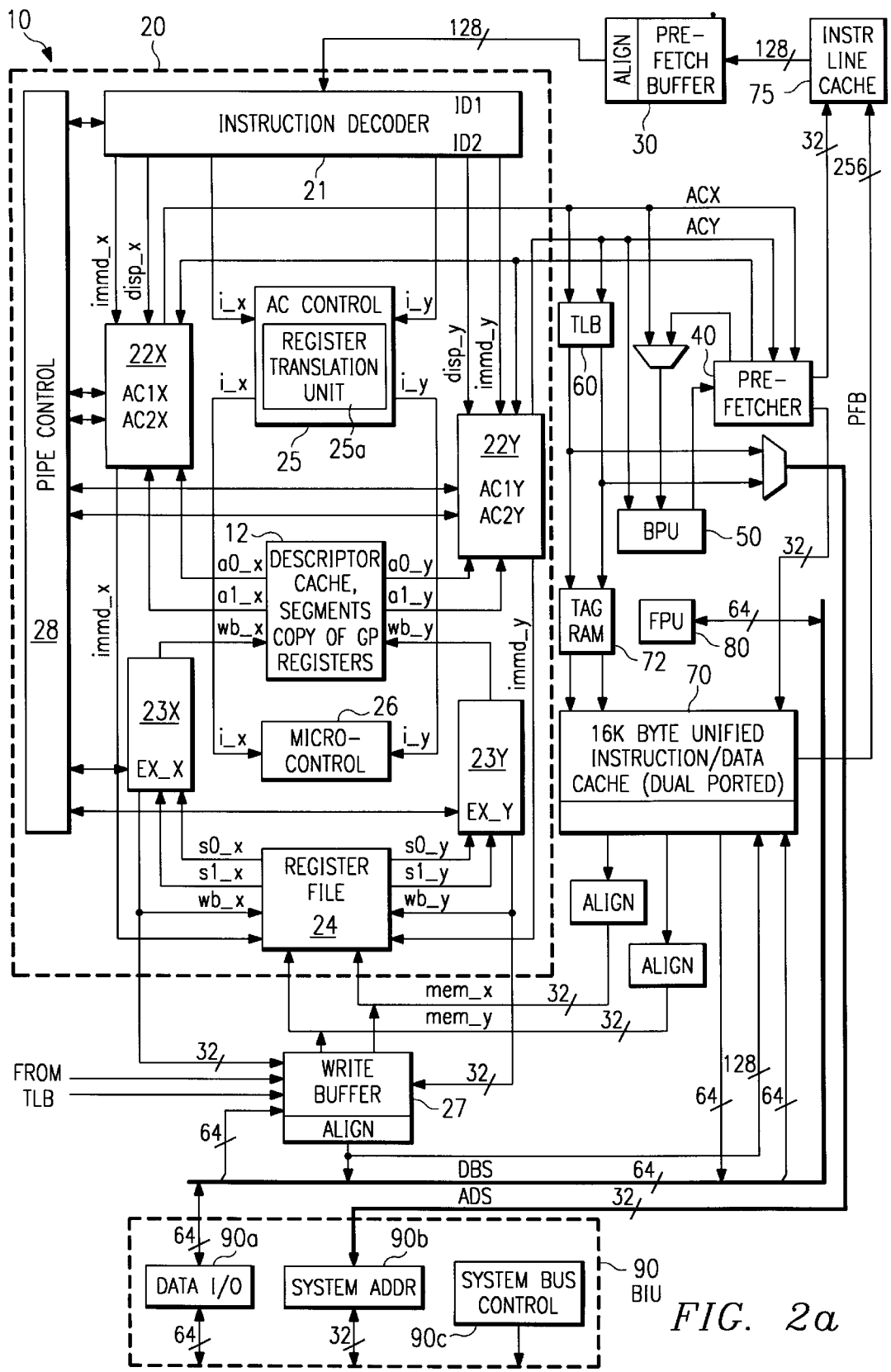

FIGS. 2a and 2b illustrate an exemplary super-pipelined processor 10, into which the preferred embodiment of the invention may be implemented. It is, of course, to be understood that the present invention may be applicable to microprocessors of other architectures or other integrated circuits containing register files that may benefit from the present invention.

As shown in FIG. 2a, the major sub-blocks of a microprocessor 10 include: (a) an execution core 20, (b) a prefetch buffer 30, (c) a prefetcher 40, (d) branch processing unit (BPU) 50, (e) translation lookaside buffer (TLB) 60, and (f) unified 16 Kbyte instruction/data cache 70, including TAG RAM 72. A 256 byte instruction line cache 75 provides a primary instruction cache to reduce instruction fetches to the unified cache, which operates as a secondary instruction cache. An onboard floating point unit (FPU) 80 executes floating point instructions issued to it by the execution core 20.

The microprocessor 10 uses internal 32-bit address and 64-bit data buses ADS and DBS. Interface to external 32 bit address and 64 bit data buses is through a bus interface unit (BIU) 90. The BIU 90 includes three interface units: a DATA and I/O 90a, a System Address Unit 90b and a System Bus Control Unit 90c. A 256 bit (32 byte) prefetch bus (PFB), corresponding to the 32 byte line size of the unified instruction/data cache 70 and the instruction line cache 75, allows a full line of 32 instruction bytes to be transferred to the instruction line cache 75 in a single clock.

The unified instruction/data cache 70 is 4-way associative (with a 4k set size) cache, using a pseudo-LRU replacement algorithm, with write-through and write-back modes. It is dual ported (through banking) to permit two memory accesses (data read, instruction fetch, or data write) per clock. The instruction line cache 75 is a fully associative, lookaside implementation (relative to the unified cache), using an LRU replacement algorithm.

The execution core 20 is a superscalar design with two execution pipes X and Y. It includes an instruction decoder 21, address calculation units 22X and 22Y, execution units 23X and 23Y, and a register file 24 including thirty-two 32 bit registers. AC control unit 25 includes a register translation unit 25a. A microcontrol unit 26, including a microsequencer and microROM, provides execution control. AC control unit 25 along with microcontrol unit 26 controls the transfer of data from register file 24 to the execution units 23X and 23Y.

Writes to the unified instruction/data cache 70 from the execution core 20 are queued into twelve 32 bit write buffers 27. AC control unit 25 provides buffer allocation. These write buffers 27 provide an interface for writes to the unified cache—non-cacheable writes go directly form the write buffers 27 to external memory. The write buffer logic supports optional read sourcing and write gathering.

A pipe control unit 28 controls instruction flow through the execution pipes, including keeping the instructions in order until it is determined that an instruction will not cause an exception, squashing bubbles in the instruction stream, and flushing the execution pipes behind branches that are mispredicted and instructions that cause an exception. For each stage, the pipe control unit 28 keeps track of which execution pipe contains the earliest instruction, provides a stall output, and receives a delay input.

Referring to FIG. 2b, the microprocessor has seven-stage X and Y execution pipelines: instruction fetch IF, two instruction decode stages ID1 and ID2, two address calculation stages AC1 and AC2, execution EX, and write-back WB. Note that the complex instruction decode ID and address calculation AC pipe stages are super pipelined.

The IF stage provides a continuous code stream into the CPU core 20. The prefetcher 40 fetches 16 bytes of instruction data into the prefetch buffer 30 from either the (primary) instruction line cache 75 or the (secondary) unified instruction/data cache 70. BPU 50 is accessed with the prefetch address, and supplies target addresses to the prefetcher 40 for predicted changes of flow, allowing the prefetcher 40 to shift to a new code stream in one clock.

The decode stages ID1 and ID2 decode the variable length X86 instruction set. The instruction decoder 21 retrieves 16 bytes of instruction data from the prefetch buffer 30 each clock. In ID1, the length of two instructions is decoded (one each for the X and Y execution pipes) to obtain the X and Y instruction pointers—a corresponding X and Y bytes-used signal is sent back to the prefetch buffer 30 (which then increments for the next 16 byte transfer). Also in ID1, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2x to AC1y, and from ID2y to AC1x. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, PUSHA/POPA, and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). During this pipe stage, data dependencies are also checked and resolved using the register translation unit 25a (register scoreboard and register renaming hardware)—the 32 physical registers in register file 24 are used to map the 8 general purpose programmer visible logical registers defined in the X86 architecture (EAX, EBX, ECX, EDX, EDI, ESI, EBP, ESP). During the AC2 stage, the register file 24 and the unified instruction/data cache 70 are accessed with the physical address (for cache hits, cache access time for the dual ported unified cache is the same as that of a register, effectively extending the register set)—the physical address is either the linear address, or if address translation is enabled, a translated address is generated by the TLB 60. A descriptor cache 12 is used to store the most recent definitions for segmentation and the general purpose registers in register file 24. The AC control unit 25 uses the definitions of the general purpose registers in descriptor cache 12 to perform address calculations for the register file 24.

Translated addresses are generated by the TLB 60 from the linear address using information from page tables in memory and workspace control registers on chip. The unified instruction/data cache 70 is virtually indexed and physically tagged to permit, when address translation is enabled, set selection with the untranslated address (available at the end of AC1) and, for each set, tag comparison with the translated address from the TLB 60 (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU 80)—because integer instructions that may still cause an exception in EX are designated exclusive, and therefore are issued alone into both execution pipes, handling exceptions in order is ensured.

The execution stages EX__X and EX__Y perform the operations defined by the instruction. Instructions spend a variable number of clocks in EX, i.e., they are allowed to execute out of order (out of order completion).

The write back stage WB updates the register file 24, condition codes, and other parts of the machine state with the results of the previously executed instruction.

Figure 3:
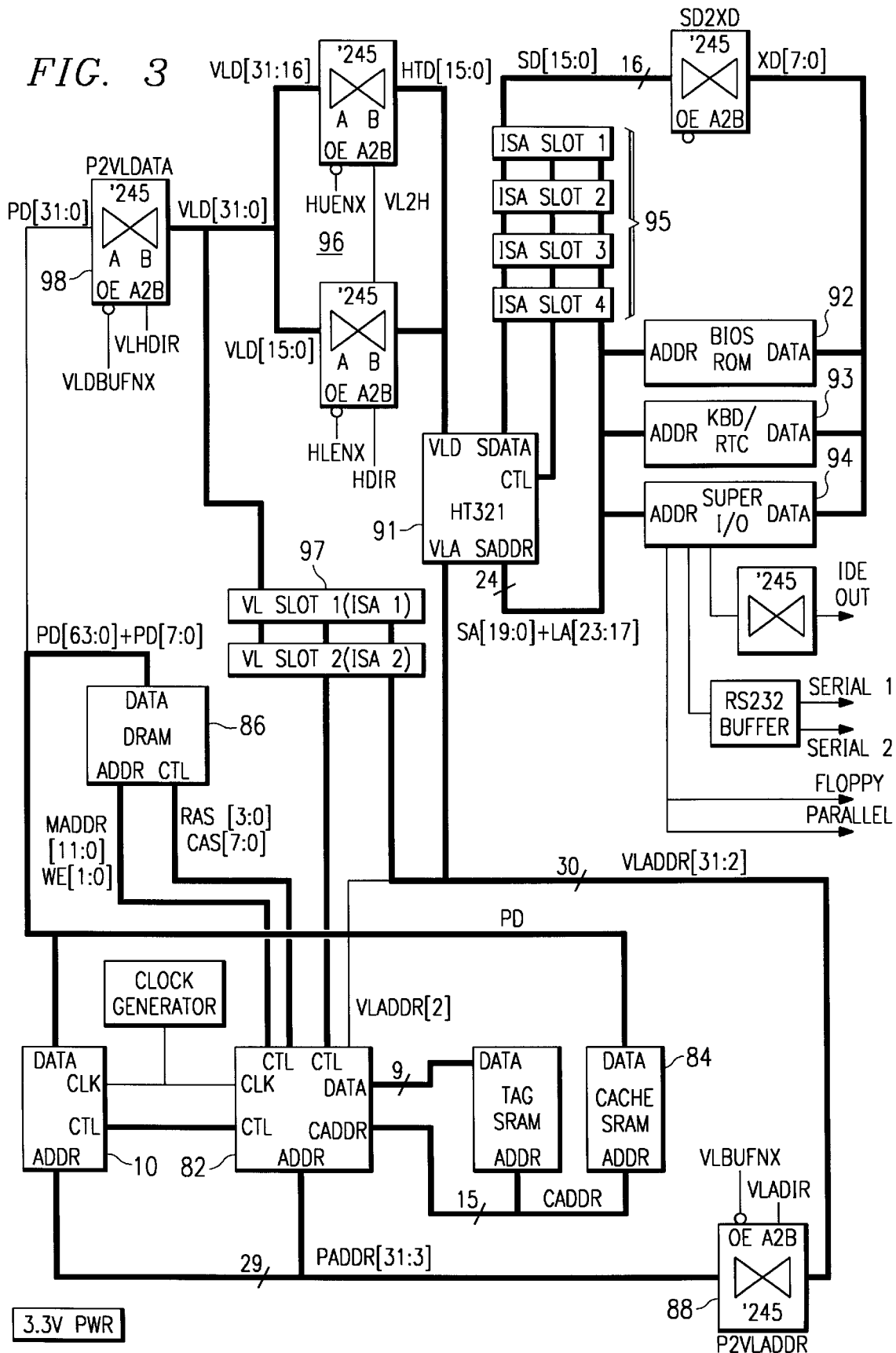
FIG. 3 illustrates an electrical diagram, in block form, of the system in which the microprocessor of FIG. 2 may be incorporated.

An exemplary system in which a processor of FIG. 2 may be used is now described with reference to FIG. 3.

For the exemplary embodiment, microprocessor 10 is used in a processor system that includes a single chip memory/bus controller 82. The memory/bus controller 82 provides the interface between the microprocessor and the external memory subsystem—level two cache 84 and main memory 86—controlling data movement over the 64 bit processor data bus PD (the data path is external to the controller which reduces its pin count and cost).

Memory/ bus controller 82 interfaces directly to the 32-bit address bus PADDR, and includes a one bit wide data port (not shown) for reading and writing registers within the controller. A bi-directional isolation buffer 88 provides an address interface between microprocessor 10 and VL and ISA buses.

Memory/bus controller 82 provides control for the VL and ISA bus interface. A VL/ISA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The VL/ISA interface chip 91 interfaces to the 32 bit VL bus through a bi-directional 32/16 multiplexer 96 formed by dual high/low word [31:16]/[15:0] isolation buffers. The VL bus interfaces to standard VL slots 97, and through a bi-directional isolation buffer 98 to the low double word [31:0] of the 64 bit processor data bus.

Figure 4:
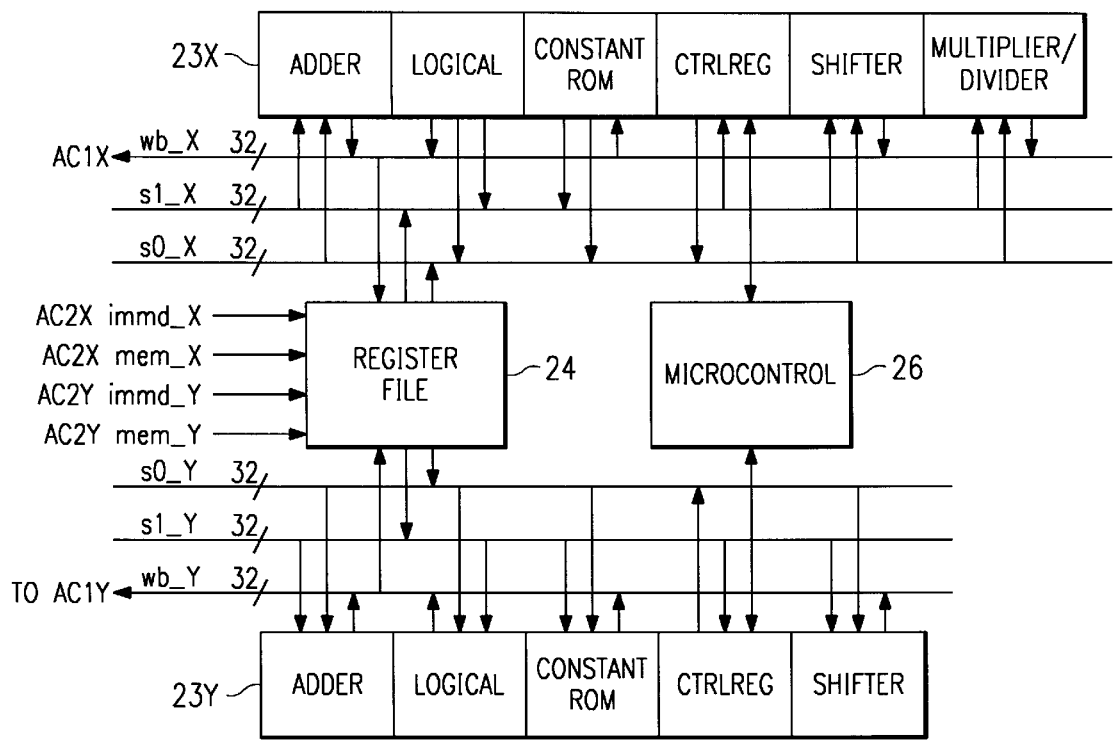
FIG. 4 illustrates, in block diagram form, the execution unit and register file of FIG. 2 in more detail.

In FIG. 4, the execution unit 23 and the register file 24 are depicted in more detail. The execution unit 23 contains two execution pipelines: the EX__X pipeline 23X and the EX__Y pipeline 23Y. These pipelines are organized as two datapaths each with the common functional units: logical unit, adder unit, constant ROM and shifter. The EX__X pipeline 23X also includes an additional function unit, a multiplier/divider. Each functional unit of the EX__X pipeline 23X has two inputs, one from the bus s0__x and one from the bus s1__x, and an output to bus wb__x. Similarly, each functional unit of the EX__Y pipeline 23Y has two inputs, one from the bus s0__y and one from the bus s1__y, and an output to bus wb__y. The register file 24 has four outputs to the s0__x, s1__x, s0__y, s1__x buses and two inputs to the wb__x and wb__y buses. Other inputs to the register file 24 include bus immed__x from the ACX unit 22X and bus immed__y from the ACX unit 22Y as well as bus mem__x and mem__y from the unified instruction/data cache 70.

The execution pipelines EX__Y and EX__X use the s0 and s1 buses to communicate with the AC pipe stage and the register file 24. Under the control of the AC control 25 and micro-control 26, the register file 24 drives operands from the register file onto the s0 and s1 buses.

The immd__x and immd__y buses contain immediate data of instructions from the AC units 22X and 22Y respectively. This data can be directly sourced onto the s0 and s1 buses as necessary under the control of an S bus driver (not shown in FIG. 4). The mem__x and mem__y buses contain data from the unified instruction/data cache 70. This data can also be directly sourced onto the s0 and s1 buses as necessary under the control of the S bus driver.

At the completion of an instruction, the execution pipelines EX__X and EX__Y communicate the resulting operand to the register file 24 and also to the AC units 22X and 22Y on the write back buses wb__x and wb__y.

Figure 5:
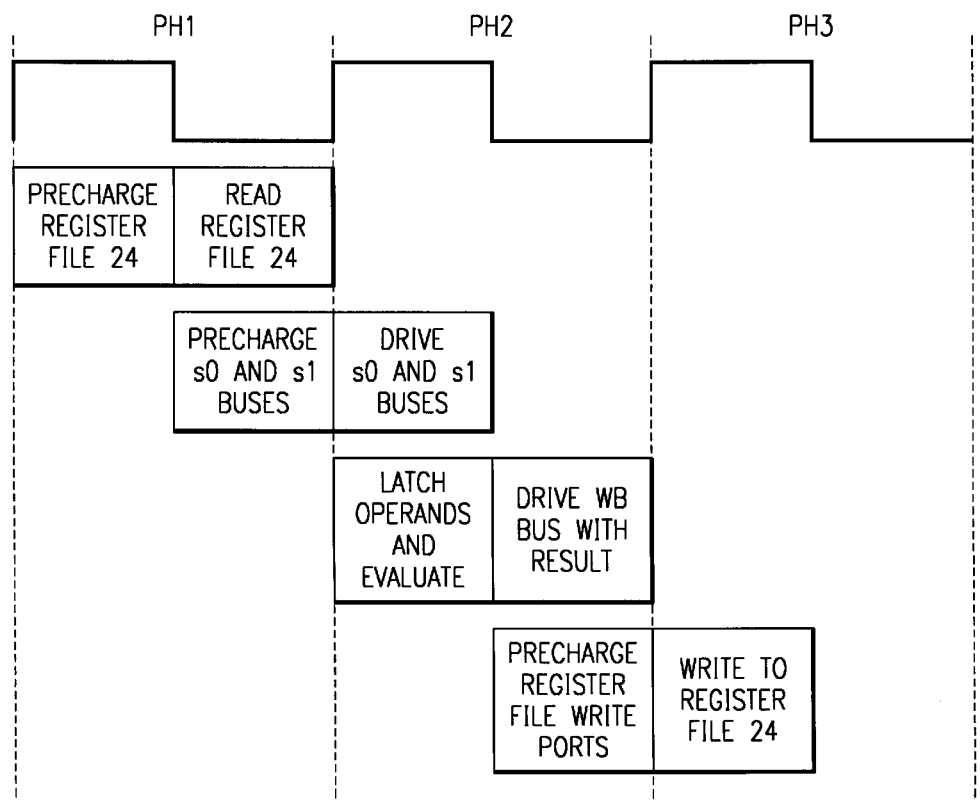
FIG. 5 illustrates a timing diagram of the communications between the register file and the execution unit.

FIG. 5 illustrates a timing diagram of the flow of data between the execution pipelines EX__X and EX__Y and the register file 24. The diagram illustrates three processor clock periods, PH1, PH2 and PH3. In PH1, the register file 24 is accessed under the control of AC control 25 and microcontrol 26 and the s0 and s1 buses are precharged. In PH2, the execution unit receives the operands from the s0 and s1 buses and performs the instruction. The write back bus wb__x is then driven with the result of the instruction. During PH3, the result is written back to the register file 24.

Figure 6:
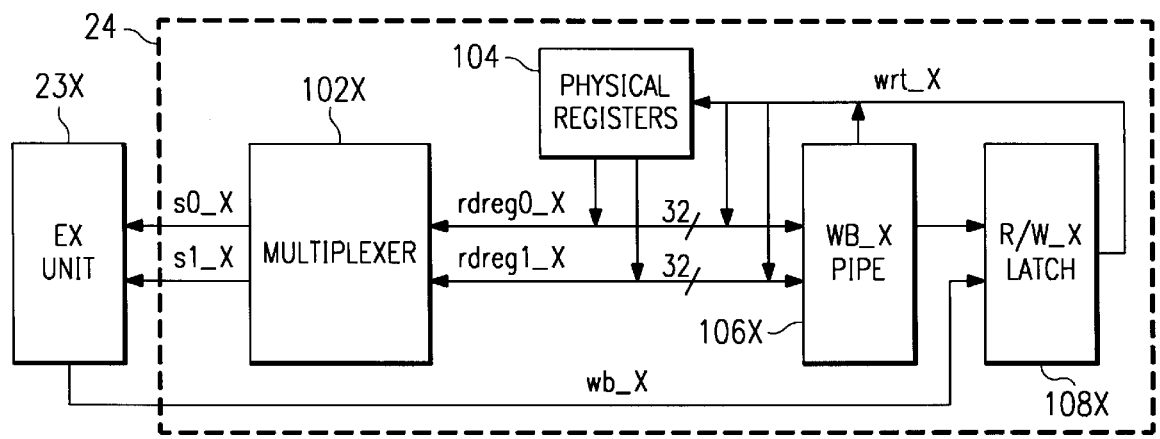
FIG. 6 illustrates, in block diagram form, the register file according to the present invention.

FIG. 6 illustrates in block diagram form the preferred embodiment of register file 24 of the present invention. The register file 24 contains two components: an X component and a Y component. Though FIG. 6 illustrates only the X component of the register file 24, the Y component is similarly constructed and operates in a similar manner.

The register file 24 in the preferred embodiment includes thirty-two, 32-bit physical registers 104, however a person skilled in the art can easily appreciate that the present invention may be implemented with any number of registers of any size, such as 64 bit registers.

Register file 24 includes multiplexer 102X connected to physical registers 104 by 32 bit buses rdreg0__x and rdreg1__x. Register file 24 further includes write back pipe (WB__x pipe) 106X and Read/Write latch (R/W__x latch) 108X. The buses rdreg0__x and rdreg1__x connect physical registers 104 to WB__x pipe 106X. R/W__x latch 108X is connected to the execution units 23X and 23Y by write back bus wb__x and to the physical registers 104 by write bus wrt__x.

Figure 7:
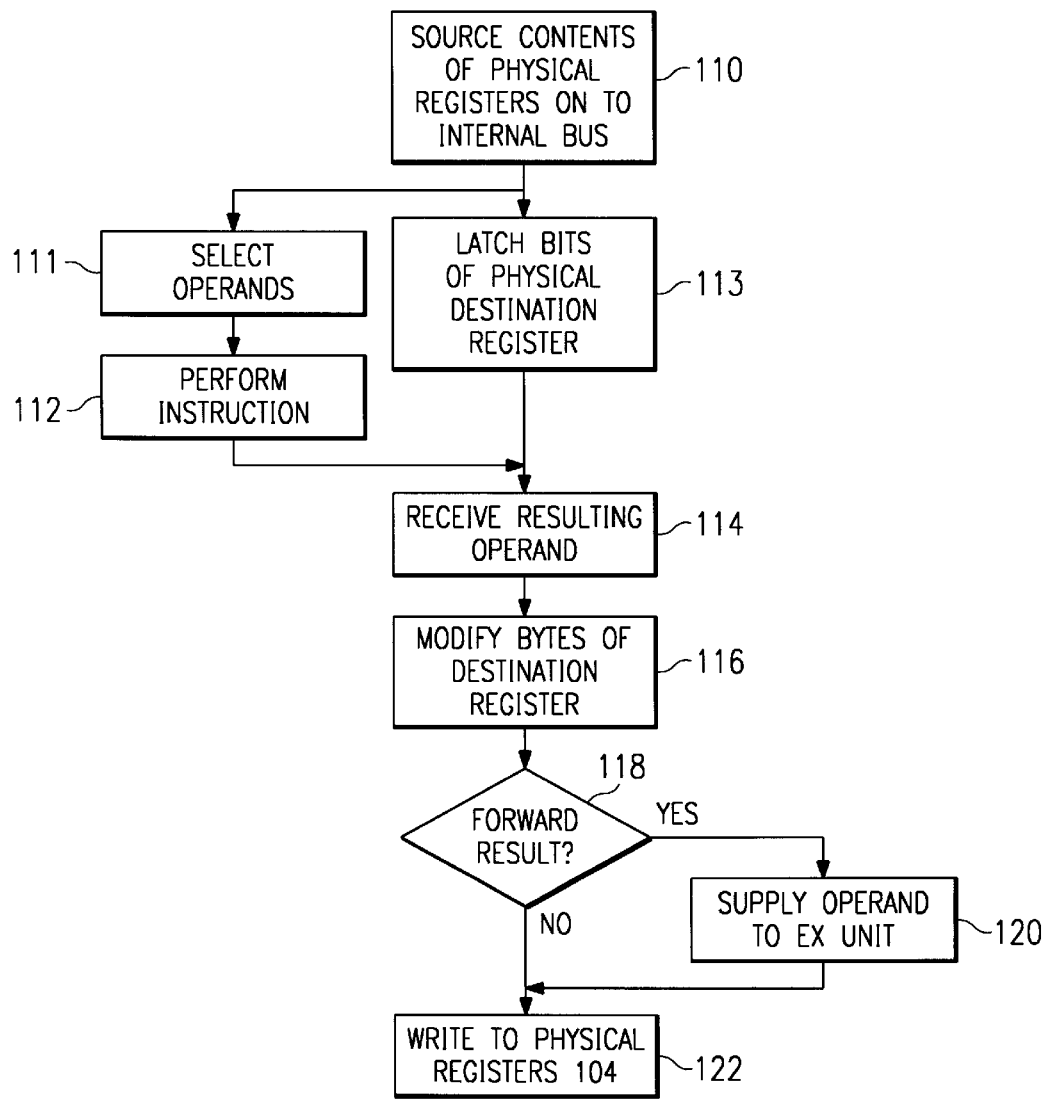
FIG. 7 illustrates a flow diagram describing the method of operation of the present invention.

The operation of the register file 24 is explained in more detail with respect to FIG. 7. As depicted in Block 110, the entire 32 bits of two physical registers which include the operands for the current instruction are sourced onto buses regrd0__x or regrd1__x, as appropriate. For example, if the current instruction is MOV AX, BX and physical register 1 contains logical source register EAX and physical register 2 contains logical source register EBX, then the entire 32 bits of physical register 1 and physical register 2 are driven onto the regrd buses. In addition, a single physical register may not be allocated to a single logical general purpose register. For instance, AH may be allocated to physical register 1 while AL may be allocated to physical register 2. Thus, for the instruction MOV AL, AH, both physical registers 1 and 2 are sourced onto the regrd buses.

As depicted in block 111, under the control of the S bus driver, multiplexer 102X only passes through the bits of the physical registers corresponding to the logical source registers, i.e. the operands for the instruction. Thus, for sixteen bit or thirty-two bit operands, multiplexer 102X passes through bits 0 through 15 and bits 0 through 31 respectfully. Similarly, the multiplexer 102X passes through 8 bit operands corresponding to bits 0 through 7 for 8 bit operands. However, 8-bit operands from register bit positions 8 through 15 are multiplexed to the lower 8 bit positions of 0 through 7 bits on the data line. For example, an operand from the logical register AH is multiplexed to the lower bits 0 through 7 of the data line. This move is performed to simplify the operation of the functional units in the execution pipeline, since the functional units expect to receive operands beginning at bit position 0 of the data line.

The execution unit receives the operands and performs the instruction as illustrated in process step 112. The execution unit will then return a resulting operand to the register file 24.

Referring now to process step 113, while the multiplexer 102X is selecting the operand, the WB pipe 106 latches the entire 32 bits of the physical register which includes the destination register when the bits are sourced onto the regrd buses. For example, suppose physical register 0 contains the logical general purpose register EAX and physical register 1 contains the logical general purpose register EBX. If the current instruction is ADD AX, BX, then AX and BX are the logical source registers and AX is also the logical destination register, as is well known in the prior art. WB pipe 106X will thus latch the entire 32 bits of physical register 0, i.e. the physical register which includes the logical destination register AX. In another example, if the current instruction is MOV CH, DL, then CH and DL are the logical source registers and CH also is the logical destination register. If physical register 2 contains ECX and physical register 3 contains EDX, then WB pipe 106 will latch the entire 32 bits of physical register 2, i.e. the physical register storing the logical destination register CH.

As illustrated in block 114 in FIG. 7, at the completion of an instruction, the execution unit 23X returns the resulting operand on write back bus wb_x to R/W_x latch 108X. R/W_x latch also receives the entire 32 bits of the physical register (which includes the logical destination register) from WB_x pipe 106X. R/W_x latch 108X overwrites the bits corresponding to the destination register in WB_X pipe 106X with the bits of the resulting operand on write back bus wb_x, as depicted block 116.

For example, in the instruction described above MOV CH, DL, the EX_X execution unit 23X returns the resulting 8-bit operand CH to R/W_x latch 108X on write back bus wb_x. The R/W_x latch 108X also receives the 32 bits of physical register 2 (which included destination register CH) latched in WB_x pipe 106X. R/W_x latch 108X overwrites bits 8 through 15 of the physical 2, i.e. the bits corresponding to destination register CH, with the resulting 8-bit operand from the execution unit.

In block 118, the process decides whether forward the results to the execution unit. If so, the selected 32 bits of the physical register are written back to physical registers 104. In our example above, the selected 32 bits of physical register 2, corresponding to logical register ECX, are then written back to physical registers 104. Though logical register ECX may originally have been contained in physical register 2, the 32 bits of logical destination general purpose register ECX are not written back to physical register 2. Instead, to eliminate write after read (WAR) and write after write (WAW) hazards, a new physical register is assigned each time a logical register is altered. The AC unit, in the above example, then allocates a "free" physical register which is not in use for the selected 32 bits of the logical register ECX.

Alternatively, in decision block 118, the physical registers 104 may be temporarily bypassed to perform an operation called "result forwarding". As shown in block 120, the selected 32 bits in the read/write latch 108 may be forwarded to the execution unit as well as written to the physical registers 104. The selected bits are forwarded to the execution unit 23X via buses rdreg0_x or rdreg1_x and are concurrently written to physical registers 104, as shown in block 122. This step will occur to prevent certain read after write dependencies when one of the instructions is a "non-working" instruction such as a MOV.

For an example of result forwarding, the following sequence of instructions is used:

1) ADD AX, BX
2) MOV CX, AX

Result forwarding modifies the MOV command such that the CX register is loaded with the data generated as the result of the ADD instruction. Assuming that physical register "0" is allocated to logical source register BX, physical register "1" is allocated to logical source register AX, physical register "2" is allocated to logical destination register AX and physical register "3" is allocated to logical destination register CX, there exists a RAW dependency between the two instructions, since the destination of the ADD instruction (physical register 2) is the source of the MOV instruction.

After result forwarding, the ADD instruction remains unchanged; however the residual control word associated with the MOV instruction is modified such that the execution unit receives its data for CX (physical register 3) receives its data from the write-back bus, wb_x or wb_y, associated with the EX unit performing the ADD at the same time EAX is written to physical registers 104. Consequently, the RAW dependency is eliminated, and both the ADD and the MOV instructions may be executed simultaneously.

Figure 8:
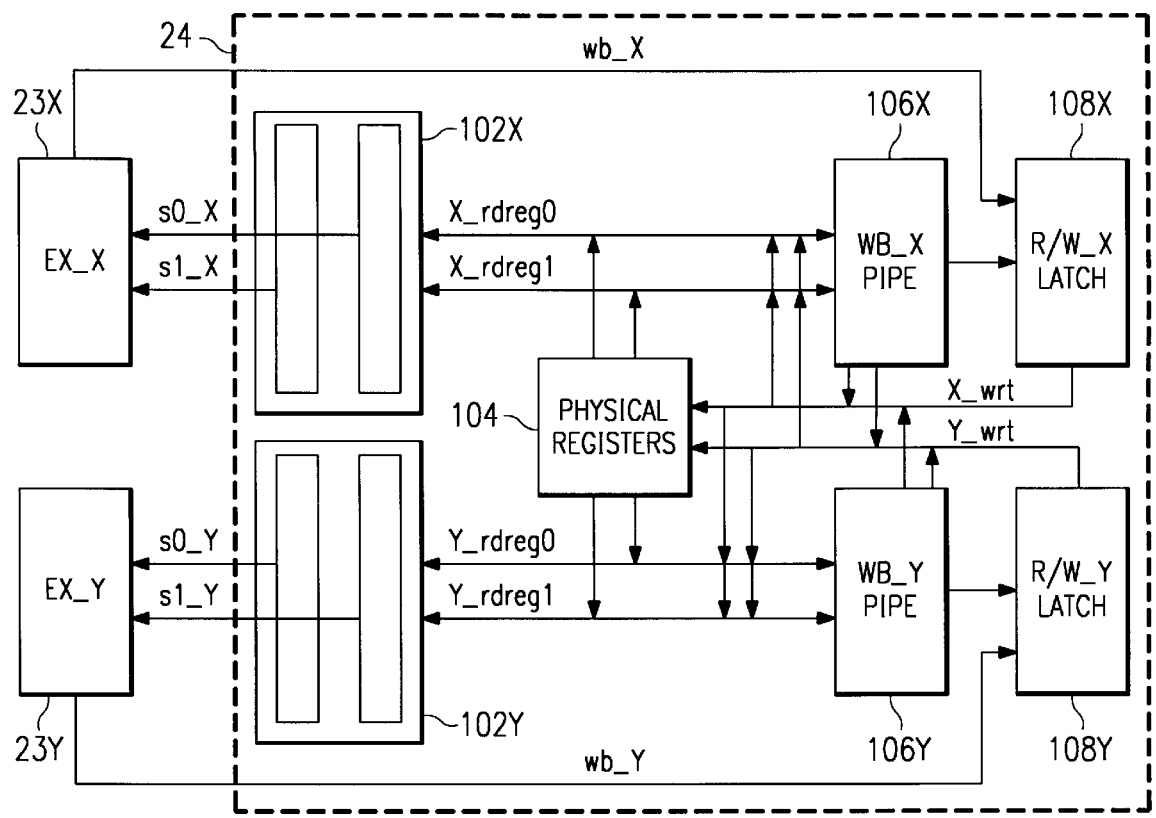
FIG. 8 illustrates the register file according to the present invention in an electrical diagram, in block form.

With reference to FIG. 8, a block diagram is shown of both X and Y components of the register file 24 corresponding to the X and Y pipelines. The Y component is similar in design to the X component of the register file 24 shown in FIG. 6. The Y component includes a multiplexer 102Y connected to the Y pipeline execution unit EX_Y by 32 bit buses s0_y and s1_y. The physical registers 104 are connected to both the multiplexer 102Y and write back pipe (wb_y pipe) 106Y by buses y_rdreg0 and y_rdreg1. The wb_y pipe 106Y is connected to read/write latch (R/W_y latch) 108y. R/W_Y latch 108y is also connected to EX_Y execution unit 23Y via bus wb_y. The operation of Y component of register file 24 is similar to that described hereinabove with respect to the X component of register file 24 and depicted in FIG. 7.

FIG. 8 also shows the interconnections between the X and Y components of register file 24. As seen in FIG. 8, the x_wrt bus is connected to not only buses x_rdreg0 and x_rdreg1, but also to buses y_rdreg0 and y_rdreg1. These connections allow for result forwarding of operands in the R/W_x latch 108X to the EX_Y execution unit 23Y via buses y_rdreg0 and yrdreg1 as well as to the EX_X execution unit via buses x_rdreg0 and xrdreg1. Similarly, y_wrt bus is connected to both y_rdreg0 and y_rdreg1 buses and to x_rdreg0 and x_rdreg1 buses. These connections allow for result forwarding of operands in the R/W_y latch 108Y to the EX_X execution unit via buses x_rdreg0 and xrdreg1 and to the EX_Y execution unit 23Y via buses y_rdreg0 and yrdreg1.

In addition, the WB_x pipe 106X is connected to both the x_wrt bus and y_wrt bus, and similarly, the WB_y pipe 106Y is connected to both the x_wrt bus and y_wrt bus. The WB pipes 106X and 106Y may source their respective contents to either x_rdreg0, x_rdreg1 or to y_rdreg0, y_rdreg1 prior to communicating their contents to respective read/write latches 108X and 108Y.

Figure 9:
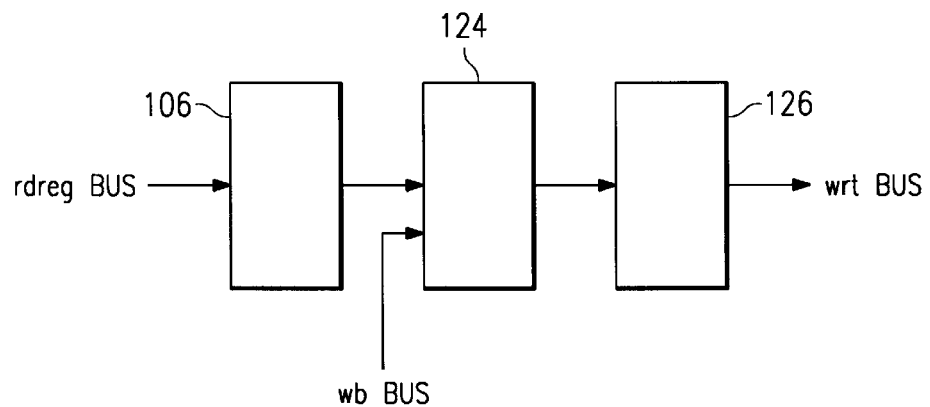
FIG. 9 illustrates, in block diagram form, the read/write latch of the present invention.

FIG. 9 illustrates R/W latch 108 in further detail. R/W latch 108 includes a 2 to 1 R/W multiplexer 124 and write/back latch (wb_latch) 126. Though R/W latch is shown as a single functional unit, R/W latch comprises two components: an X component 108 X and a Y component 108Y, as seen in FIG. 8, both of which are similar to that shown in FIG. 9.

The R/W multiplexer 124 selects on a byte basis between the bytes in wb_pipe and the bytes on wb bus in response to a select byte signal. The select byte signal indicates which bytes latched in the wb_pipe of the source logical register to overwrite with the bytes of the result operand on the wb bus. For example, for the instruction MOV BH, AL, the wb pipe latches the entire 32 bits of logical register EBX, as explained hereinabove. R/W multiplexer 124 then selects the upper two bytes (bits 31 through 16) and the lower byte (bits 7 through 0) from wb pipe and the upper byte of the lower word (bits 15 through 8) from wb bus in response to the select byte signal. Write/back latch 126 latches the entire 32 bits selected and sources the entire 32 bits of logical register EBX onto wrt bus.

From the above description of the invention, a person skilled in the art can appreciate the advantages of the present invention. Register file 24 allows for modification of a plurality of registers on a byte by byte basis without the need for more than one control line to each register. This advantage increases as the size of the registers increase and the number of registers in a register file increase. For example, for 32 physical registers of 64 bits to be writable according to the prior art method over 250 control lines are necessary. However, the present invention allows for byte-writable 64 bit registers by merely increasing the size of the buses and Wb pipe and R/W latch. No additional control lines are necessary.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A processor including an execution unit for executing instructions referencing a defined set of logical registers as logical source and destination registers respectively for source and destination operands, and a register file for storing source and destination operands with multiple addressable sizes, comprising:

a plurality of physical registers in the register file selectively allocated to respective ones of said logical source and destination registers as corresponding physical source and destination registers, wherein the physical registers have multiple addressable sizes corresponding to source and destination operands with multiple sizes;

in response to executing a current instruction, the execution unit accesses corresponding source operands and generates a corresponding destination operand with a predetermined size;

a latching circuit that, for such current instruction, stores the current contents of the physical destination register; and a read/write circuit that, for such current instruction, receives the current contents of the physical destination register from the latching circuit and the destination operand from the execution unit, and selects as the new contents of the physical destination register the combination of the destination operand and any portion of the current contents of the physical destination register that does not correspond to the destination operand as determined by the size of the destination operand.

2. The processor of claim 1 wherein said read/write circuit selects the data from the latching circuit and the resulting data on a byte by byte basis.

3. The processor of claim 1 wherein a set of logical registers are mapped to said plurality of registers.

4. The processor of claim 1 further including a multiplexer that receives the data from one of said plurality of registers and selects an operand from the data from one of said plurality of registers and provides said operand to the execution unit.

5. A method of updating a register file used in processor including an execution unit for executing instructions referencing a defined set of logical registers as logical source and destination registers respectively for source and destination operands, where the register file stores source and destination operands with multiple addressable sizes, comprising the steps:

(a) selectively allocating a plurality of physical registers in the register file to respective ones of the logical source and destination registers as corresponding physical source and destination registers, wherein the physical registers have multiple addressable sizes corresponding to source and destination operands with multiple sizes;

(b) executing a current instruction in the execution unit, including accessing corresponding source operands, and generating a corresponding destination operand with a predetermined size;

(c) for such current instruction, reading and latching the current contents of the physical destination register; and (d) for such current instruction, modifying the latched current contents of the physical destination register by selecting as the new contents of the physical destination register the combination of the destination operand and any portion of the current contents of the physical destination register that does not correspond to the destination operand as determined by the size of the destination operand; and (e) writing the new contents of the physical destination register into the register file.

6. The method of claim 5, wherein the step of modifying the latched current contents of the physical destination register is accomplished on a byte by byte basis.

* * * * *